Aug. 11, 1931.   O. H. KLOTZ   1,818,895
REACTION RELIEF DEVICE
Filed Aug. 4, 1930   2 Sheets-Sheet 1
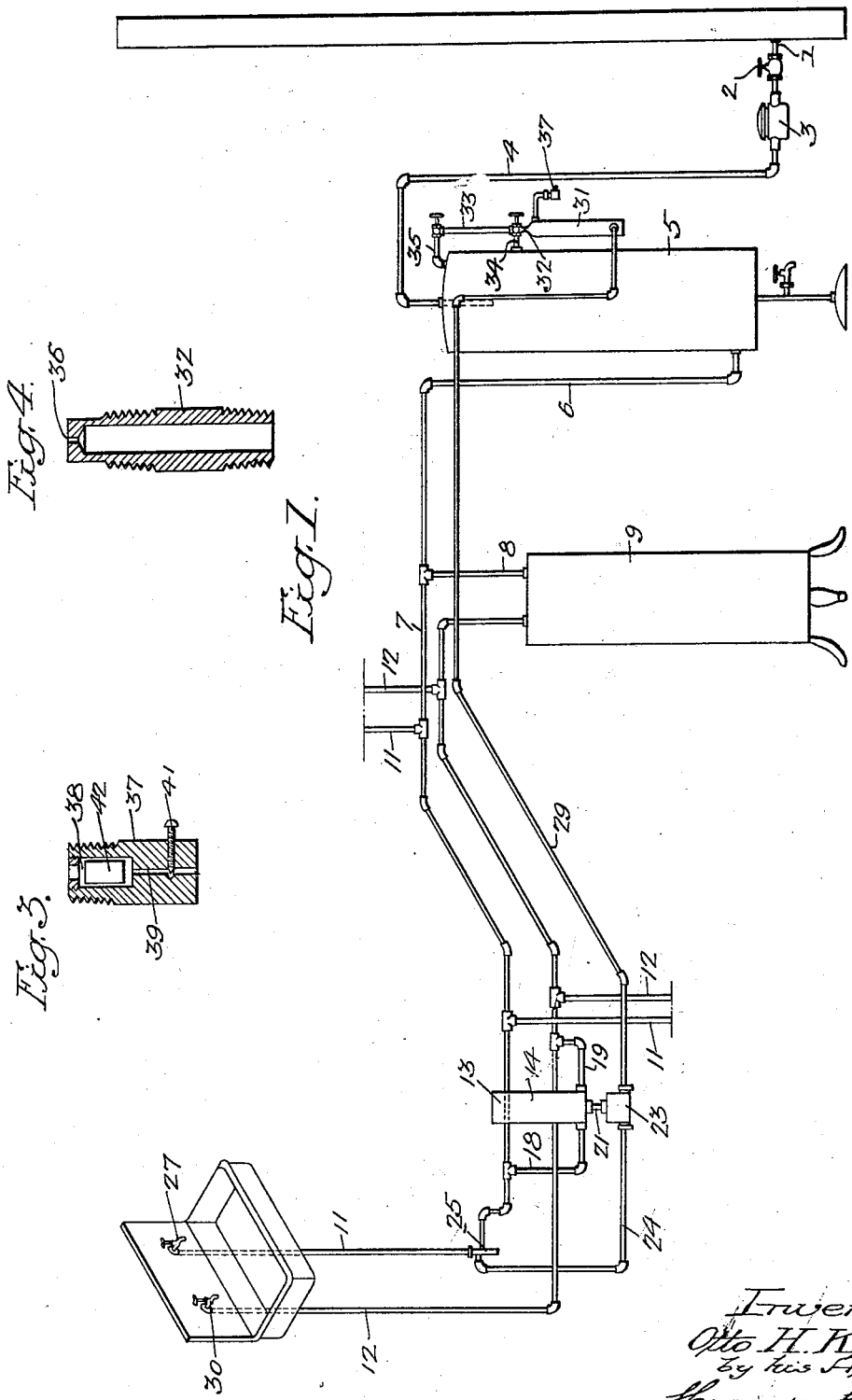

Aug. 11, 1931.         O. H. KLOTZ         1,818,895
               REACTION RELIEF DEVICE
             Filed Aug. 4, 1930      2 Sheets-Sheet 2
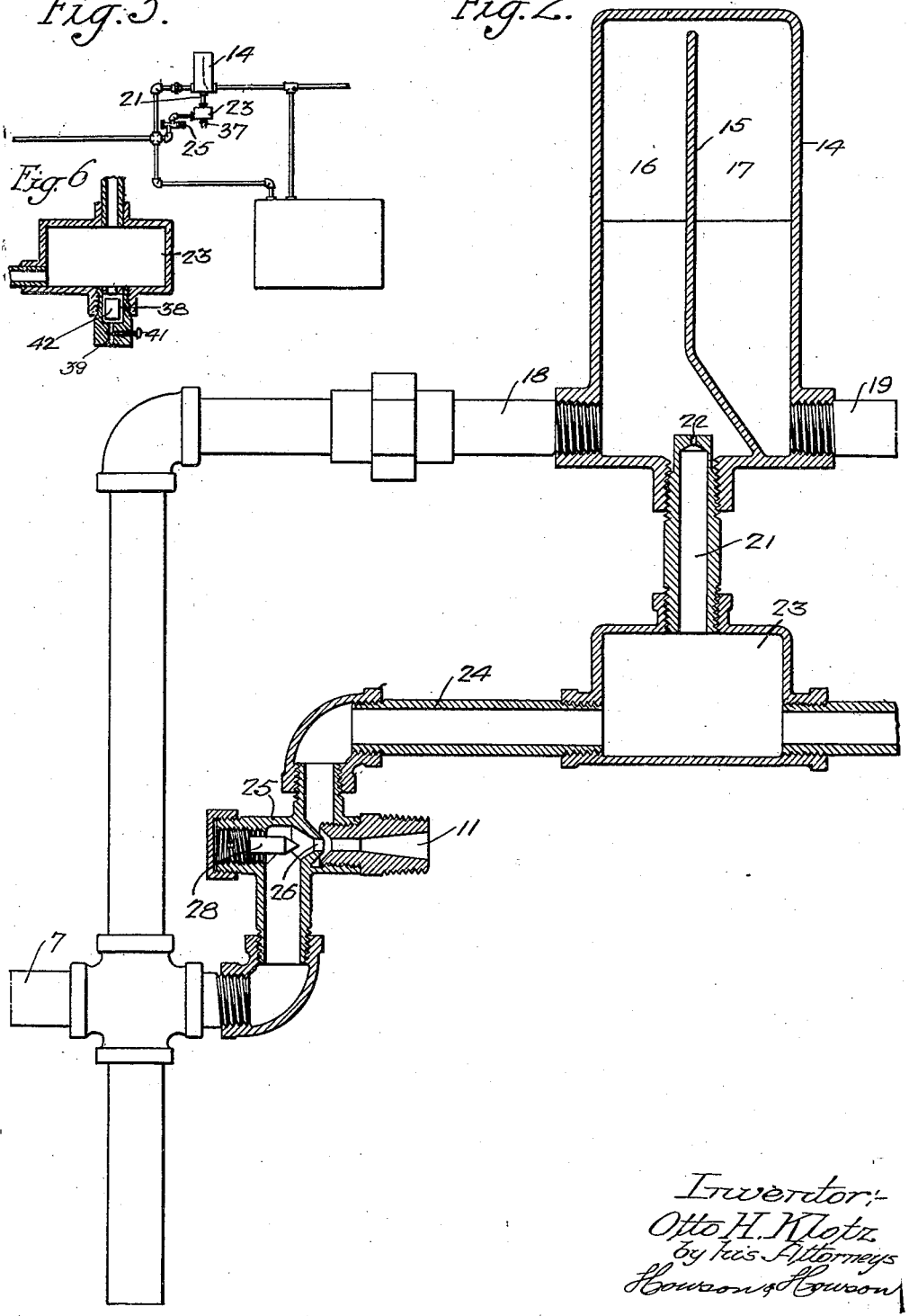
Inventor:-
Otto H. Klotz
by his Attorneys
Howson & Howson

Patented Aug. 11, 1931

1,818,895

UNITED STATES PATENT OFFICE

OTTO H. KLOTZ, OF PHILADELPHIA, PENNSYLVANIA

REACTION RELIEF DEVICE

Application filed August 4, 1930. Serial No. 473,011.

An object of this invention is to provide a novel and improved reaction relief device of the type adapted to be inserted in water systems to relieve the reaction shocks due to sudden interruption of flow in the system.

A more specific object of the invention is to provide a reaction relief device which is adapted to afford direct relief to the hot water side of a water system as well as the cold water.

Another object of the invention is to provide novel means for maintaining in the device the air cushion which constitutes the active relief means.

Still another object is to provide an improved system of piping including my novel relief device or its equivalent together with means for maintaining an effective air cushion between the distribution piping and the water main.

A further object is to provide a novel piping system for houses effecting a material economy of fuel in the heating of the water for household uses.

A still further object is to provide a system of the stated type including means for preventing "sweating" of the pipes and fixtures due to excessive differences between the atmospheric and water temperatures.

The invention also contemplates provision of means for offsetting loss of pressure at the faucets due to any of various causes, such as pressure fluctuation in the main; and also provision of water storage available at the fixtures in the event of complete or partial interruption of the main supply.

The invention further resides in the novel arrangement of elements and details of construction hereinafter described and claimed and illustrated in the attached drawings, in which:

Figure 1 is a diagrammatic view illustrating a water system made in accordance with my invention;

Fig. 2 is an enlarged partial sectional view illustrating details of the system;

Figs. 3 and 4 are detached sectional views of elements of the system;

Fig. 5 is a diagrammatic view illustrating a modified form of system embodying my invention, and Fig. 6 is an enlarged sectional view illustrating a detail of the system shown in Fig. 5.

With reference to Fig. 1, showing a typical household water supply system in accordance with my invention, 1 indicates the water main entering the house, which main is controlled in the usual manner by a valve 2 and is supplied with a meter 3. From the meter a pipe 4 extends down into a tank 5, the pipe entering the top of the tank and the water line being continued through a pipe 6 which connects to the bottom of the tank, as illustrated. After the usual manner, the pipe 6 divides into branches, 7 and 8 respectively, the branch 8 including a suitable water heater 9. From the hot and cold water pipes thus produced, branches 11 and 11 pass to the various cold and hot water fixtures throughout the distributing system.

Associated with the pipes 7 and 8 is a reaction relief device 13, shown in detail in Fig. 2. This device comprises a casing 14, the interior of which is divided by a partition 15 into two chambers 16 and 17 which communicate at the top, the panel terminating at a point below the top wall of the casing. The chambers 16 and 17 are connected respectively, through pipes 18 and 19, with the cold and hot water lines 7 and 8, the pipes entering the casing at the lower end thereof, as illustrated. In the bottom of the casing 14 is a fixture 21, which establishes connection through a restricted orifice 22 between the casing 14 and the upper port of a replenishing chamber 23. This replenishing chamber 23 is connected through a pipe 24 with an ejector device 25, shown in detail in Fig. 2, said device comprising a nozzle 26 which is connected to the cold water line 7, the nozzle 26 projecting into a branch pipe 11 extending to one of the cold water fixtures indicated in Fig. 1 by the numeral 27. Means is provided in the fixture 25 in the form of an adjustable needle valve 28 for restricting the nozzle 26 to increase or decrease the velocity of the water passing therethrough as required. Water passing through the cold water line 7 and the branch 11 to the fixture 27 creates a suction on the pipe 24 through the medium of the ejector nozzle 26, tending thus to evacuate the replenishing chamber 23 of its fluid contents.

The replenishing chamber 23 is also connected through a pipe 29 with the lower end of a replenishing chamber 31, the upper end of which is connected, through a fixture 32, similar to the fixture 21 previously described, with the lower end of a water-level gage column 33, this column being connected through nipples 34 and 35 with the tank 5 at vertically spaced points, as illustrated. It will be noted that the fixture 32 provides a connection between the replenishing chamber 31 and the lower end of the column 33 through a restricted orifice 36. To the upper end of the replenishing chamber 31 is connected an air inlet valve 37, this valve as shown in Fig. 3 comprising a chamber 38, from the bottom of which extends a channel 39 the extent of the opening of which is controlled in the present instance by a screw 41 threaded into the casing. Within the chamber 38 is a plunger 42 which under normal conditions rests in the bottom of the chamber and thereby closes the passage 39 and prevents escape therefrom of water or air from the interior of the system. The plunger 42, however, is adapted to be elevated by suction from the interior of the system, as hereinafter set forth, thereby permitting influx of air to the replenishing chamber 31, it being noted that the plunger 42 is of lesser cross sectional dimension than the chamber 38 whereby the inflowing air is permitted to pass into the system.

In normal operation of the system described above, water drawn from the fixture 27 results in evacuation in the replenishing chamber 23 of its normal water content, and through the pipe 29 also effects evacuation of the replenishing chamber 31. The suction thus produced elevates the plunger 42, and through the passage 39 causes an influx of air into the system. This air is drawn from the replenishing chamber 31 through the pipe 29 and into the replenishing chamber 23. While the replenishing chambers 23 and 31 are connected respectively with the lower ends of the casing 14 and column 33 both normally containing water, these connections through the orifices 22 and 36 are of such a restricted character as to prevent any substantial flow of water from the system into the said replenishing chamber. When flow of water from the fixture 27 is interrupted, the air accumulated in the replenishing chambers 23 and 31 passes upwardly through the orifices 22 and 36 into the casing 14 and the column 33, and from the column 33 into the upper end of the tank 5. The air thus trapped in the tops of the casing 14 and the tank 5 produces air cushions which effectively prevent destructive reactions and shocks due to too sudden closing of the fixture valves. Also each use of the fixture 27 results in a replenishment of the air within the casing 14 and the tank 5.

By means of the construction of the casing 14 and its communication with both the hot and cold water lines of the system, it will be apparent that this device is effective to prevent reactions occurring in both of the lines of the system. Also the use of the tank 5 as described provides an air cushion between the water main and the house piping or distributing system which is effective for maintaining a uniform flow of water through the system under practically all conditions. When a fixture, for example, is opened, the air pressure within the tank 5 functions immediately to force the water from the tank into the system, the flow of water from the main 1 being momentarily retarded but increasing in velocity as the air within the chamber 5 expands and the pressure decreases. When the fixture is closed, the flow of water from the main 1 to the tank 5 is slowly retarded until such time as the air pressure in the top of the tank 5 reaches the pressure of the water main, at which time all flow is interrupted. It will be apparent that this action is an extremely desirable one, tending to prevent all undesirable reactions and maintaining a more or less constant flow at the fixture, even under varying pressure conditions in the water main 1. In the event of complete discontinuation of the flow of water through the main 1, the air pressure within the tank 5 is sufficient to force a considerable quantity of the water accumulated in the tank to the various fixtures.

The use of the tank 5 has the further advantage of preventing sweating of the pipes due to a too great temperature differential between the atmosphere within the house and the water entering from the main 1. The temperature of the water accumulated within the tank 5 is, under normal conditions, considerably elevated by heat transfer from the atmosphere before passing to the distributing system, and thereby conforms more nearly in temperature to the temperature within the house. This also has an economic advantage, in that less fuel is required for increasing the temperature of the water in the heater 9.

In Fig. 5, I have illustrated a modification of the system utilizing the casing 14 and ejector device 25 without the tank 5. In this instance, the air intake valve 37 is applied directly to the under side of the replenishing chamber 23. Water entering the system through the main 1 and passing to one of the system fixtures through the ejector device 25 tends to evacuate the casing 23 and draws air into said replenishing chamber through the air valve 37. This air eventually passes upwardly through the fixture 21 into the casing 14, thereby providing an air cushion effective on both the cold and hot water lines, as previously described, to prevent undesirable reactions.

There may be many other modifications without departure from the invention.

I claim:

1. In a reaction relief device for water systems, the combination with a casing having a partition dividing the interior into two chambers communicating with each other at the top, of a port in each of said chambers adapting the device for connection with both the hot and cold water mains of said system.

2. In a water system comprising hot and cold water mains, the combination with a casing having a partition dividing the interior thereof into two chambers communicating at the top, of a port in each of said chambers, and ducts connecting said ports respectively with the hot and cold water mains of said system.

3. In a water system comprising hot and cold water mains, the combination with a casing having a partition dividing the interior thereof into two chambers communicating at the top, of a pair of ports in the casing opening respectively into the bottoms of said chambers, ducts connecting said ports respectively with the hot and cold water mains of said system, and means for supplying air to the said casing.

4. In a water system comprising hot and cold water mains, the combination with a casing having a partition dividing the interior thereof into two chambers communicating at the top, of a pair of ports in the casing opening into the bottoms of said chambers respectively, ducts connecting said ports respectively with the hot and cold water mains of said system, a restricted port communicating with the bottom of one of said chambers, a chamber underlying and communicating with said port and connected with one of said mains, means actuated by the flow of water in the cold water main for creating a suction tending to evacuate the last-named chamber, and a valve-controlled port in said last-named chamber for admitting air thereto.

5. The combination with a water system including hot and cold water mains, of a reaction relief device comprising a pair of chambers respectively connected at points below their tops with the said hot and cold mains, and automatic means for maintaining a supply of air in the tops of said chambers.

6. The combination with a water system including hot and cold water mains, of a reaction relief device comprising a pair of chambers respectively connected at points below their tops with the said hot and cold mains, and a single device for automatically maintaining a supply of air in the tops of both of said chambers.

7. The combination with a fluid distributing system, of a main supplying said system, a tank interposed between the main and the system, a chamber communicating with the top of the tank, said chamber having an air inlet port, a check valve normally closing said port from the inside, and suction means operative by flow in said system and connected directly with the said chamber whereby air is drawn into the chamber through the said inlet port.

8. The combination with a fluid distributing system, of a chamber connected in the system, a second chamber below the top of the first and connected thereto by a restricted orifice, said second chamber having an air intake port, a check valve normally closing the port from the interior, and means for impressing a suction directly upon the second chamber.

OTTO H. KLOTZ.